United States Patent
Balachandran et al.

(10) Patent No.: US 6,975,611 B1
(45) Date of Patent: Dec. 13, 2005

(54) METHOD AND DEVICE FOR MAC LAYER FEEDBACK IN A PACKET COMMUNICATION SYSTEM

(75) Inventors: Krishna Balachandran, Morganville, NJ (US); Subrahmanyam Dravida, Groton, MA (US); Richard P. Ejzak, Wheaton, IL (US); Sanjiv Nanda, Lunenburg, MA (US); Shiv M. Seth, Naperville, IL (US); Stanley Vitebsky, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/517,907

(22) Filed: Mar. 3, 2000
(Under 37 CFR 1.47)

Related U.S. Application Data (60) Provisional application No. 60/122,616, filed on Mar. 3, 1999, provisional application No. 60/123,291, filed on Mar. 4, 1999.

(51) Int. Cl.[7] ............................................. H04B 7/212
(52) U.S. Cl. ....................... 370/337; 370/347; 370/349; 370/468; 370/522
(58) Field of Search ............................... 370/498, 329, 370/442, 347, 348, 328, 337, 458, 345, 522 370/468; 714/746, 748

(56) References Cited

U.S. PATENT DOCUMENTS 5,910,949 A * 6/1999 Bilstrom et al. ............ 370/337
6,073,016 A * 6/2000 Hulthen et al. ........... 455/435.2
6,463,073 B1 * 10/2002 Bontu et al. ................ 370/442
6,577,618 B2 * 6/2003 Diachina et al. ............ 370/348
6,597,680 B1 * 7/2003 Lindskog et al. ........... 370/347

* cited by examiner

Primary Examiner—Ricky Ngo
Assistant Examiner—Nittaya Juntima (57) ABSTRACT

A method and communication device for media access control feedback over a packet channel divided in channel time slots is provided. The channel time slots are divided into sub-channel time slots. A packet channel feedback field associated with each sub-channel time slot is defined. Acknowledgments are indicated using the packet channel feedback field. An active mobile identity associated with an active mobile station may be assigned which would then be included in the packet channel feedback field. A plurality of active mobile identities may be assigned and some of the active mobile identities may be reserved for special functions. The assigned active mobile identity is used, among other things, to identify an active mobile station to receive packet data signals. The active mobility identity is invalidated after one transaction of packet data signals or invalidated after a short number of such transactions. One or more of the assigned active mobile identities may be used to indicate a time slot assignment for the active mobile station. A sub-channel feedback field in the packet channel feedback field is used to indicate acknowledgments. A sub-channel assignment field in the packet channel feedback field is used to indicate time slot assignments. The sub-channel assignment field is substantially independent of the sub-channel feedback field.

40 Claims, 7 Drawing Sheets

| DIRECTION | MODULATION | NUMBER OF 11 OCTET RLP SEGMENTS | PDU SIZE (BITS) | RATE 1/2 PUNCTURED CONVOLUTIONAL ENCODER OUTPUT (BITS) | PEEK TRIPLE RATE THROUGHPUT (KB/S) |
|---|---|---|---|---|---|
| DOWNLINK | π/4-DQPSK | 2 | 205 | 256 | 26.4 |
|  | 8-PSK | 3 | 293 | 348 | 39.6 |
|  | 16-LEVEL | 4 | 381 | 512 | 52.8 |
| UPLINK | π/4-DQPSK | 2 | 205 | 262 | 26.4 |
|  | 8-PSK | 3 | 293 | 357 | 39.6 |
|  | 16-LEVEL | 4 | 381 | 524 | 52.8 |
| UPLINK (ABBREVIATED) | π/4-DQPSK | 2 | 173 | 218 | 21.6 |
|  | 8-PSK | 3 | 245 | 291 | 32.4 |
|  | 16-LEVEL | 4 | 317 | 436 | 43.2 |

FIG. 9

| DIRECTION | RLP SEGMENT SIZE (OCTETS) | CRC SIZE (BITS) | RLP BLOCK SIZE (BITS) | MODULATION | NUMBER OF RLP BLOCKS PER PDU | CDSH SIZE (BITS) | PDU SIZE (BITS) | PEAK TRIPLE RATE THROUGHPUT (KB/S) |
|---|---|---|---|---|---|---|---|---|
| DOWNLINK | 37 | 16 | 104 | π/4-DQPSK | 2 | 48 | 256 | 29.6 |
|  |  |  |  | 8-PSK | 3 | 36 | 348 | 44.4 |
|  |  |  |  | 16-LEVEL | 4 | 96 | 512 | 59.2 |
| UPLINK | 38 | 14 | 106 | π/4-DQPSK | 2 | 50 | 262 | 29.7 |
|  |  |  |  | 8-PSK | 3 | 39 | 357 | 45.6 |
|  |  |  |  | 16-LEVEL | 4 | 100 | 524 | 59.4 |
| UPLINK (ABBREVIATED) | 30 | 15 | 85 | π/4-DQPSK | 2 | 48 | 218 | 24 |
|  |  |  |  | 8-PSK | 3 | 36 | 327 | 36 |
|  |  |  |  | 16-LEVEL | 4 | 96 | 436 | 48 |

FIG. 10

METHOD AND DEVICE FOR MAC LAYER FEEDBACK IN A PACKET COMMUNICATION SYSTEM

RELATED APPLICATIONS

The benefit of the filing date of U.S. provisional application Ser. No. 60/122,616, filed on Mar. 3, 1999, and U.S. provisional application Ser. No. 60/123,291, filed on Mar. 4, 1999, is hereby claimed for this application under 35 U.S.C. § 119(e).

BACKGROUND OF THE INVENTION

The present invention relates generally to a method and device for media access layer feedback in a packet data communication system and, more particularly, to a method and device for providing acknowledgments and time slot assignments using a new packet channel feedback field.

Current North American Time Division Multiple Access (TDMA) systems support voice services and circuit data services at a rate limited to 9.6 kb/s. High rate packet data services are desirable for short bursty transactions and other applications, such as world wide web/internet access, electronic mail and file transfer. Accordingly, the Telecommunications Industry Association (TIA) has adopted flexible, high performance Medium Access Control (MAC) and Radio Resource Management procedures for high rate packet data services over IS-136 TDMA channels. The characteristics of these procedures, such as a 30 kHz channel bandwidth, symbol rate and TDMA format (6 time slots every 40 ms), are in compliance with the IS-136 standard to provide compatibility with existing mobile units and in order to minimize impact on existing infrastructure.

The standards for the packet data MAC and physical layer have been designed to support higher data rates through the use of higher modulation schemes. The standard is designed to permit dynamic adaptation of the modulation scheme based on measured carrier to interference ratios (C/Is). Supported modulation schemes include coherent 8 phase shift keying (PSK) and π/4 Differential Quadrature Phase Shift Keying (DQPSK).

As set forth in the standards, a packet data channel (PDCH) is provided consisting of six logical channels. In particular, the PDCH consists of a packet broadcast channel for indicating generic system configuration related information, a packet paging channel dedicated to delivering pages, a downlink packet payload channel for delivering data generated by Logical Link Control (LLC) and General Packet Radio Services (GPRS) Mobility Management, Packet Channel Feedback (PCF) for support of random access and reserved access on the uplink, uplink packet random access channel used by mobile stations to request packet data access to the system and reverse packet payload channel for delivering data generated by the LLC and GPRS Mobility Management.

Unfortunately, the PDCH has a limited 30 kHz channel bandwidth which thus necessarily restricts the data rates that can be supported. Accordingly, there is a need in the art for methods and systems which increase the data rates possible over the PDCH and are in compliance with the standards for IS-136 time division multiple access systems.

The PDCH uses 30 kHz radio frequency channels and the time slotted structure specified in IS-136. Each 40 ms frame on a 30 kHz RF channel consists of 6 time slots (3 time slot pairs), numbered 1 to 6. One or more time slot pairs may be allocated to a PDCH. The remaining time slot pairs may be allocated to a digital control channel (DCCH) and/or digital traffic channel (DTC). A PDCH may be full rate, double rate or triple rate depending on whether 1, 2 or 3 time slot pairs are allocated to the channel within each 40 ms frame.

A multi-rate PDCH operates on a single channel frequency and consists of primary and secondary phases. In this context, a phase corresponds to a full rate portion of a multi-rate PDCH. The primary phase always corresponds to a full rate channel and is the only full rate channel that contains logical paging and broadcast channels on the downlink. Nominal paging time slots are determined using a standard hashing algorithm that relies on mobile station (subscriber) identity. Sleep mode similar to the IS-136 DCCH is defined for mobile stations in order to improve standby time.

In addition, the shared channel feedback (SCF) procedures and fields as specified in IS-136 DCCH are not well-suited for long packet data transactions and do not facilitate flexible sharing of resources among users.

Accordingly, there is a need in the art for a method and device for handling contention in a better and more flexible manner and for assigning time slots in a more flexible manner.

SUMMARY OF THE INVENTION

This need is met by a method and device in accordance with the present invention which employs an active mobile identity for acknowlegements and time slot assignments in a flexible, efficient manner.

In accordance with one aspect of the present invention, a method for media access control feedback over a packet channel divided in channel time slots is provided in a communication system. The method is comprise of the steps of dividing the channel time slots into sub-channel time slots. A packet channel feedback field associated with each sub-channel time slot is then defined. Acknowledgments are indicated using the packet channel feedback field.

The method may comprise assigning an active mobile identity associated with an active mobile station which is then included in the packet channel feedback field. Assignment of the active mobile identity may be during a transaction initiation procedure in the system. A plurality of active mobile identities may be assigned and some of the active mobile identities may be reserved for special functions.

The assigned active mobile identity may be used to identify an active mobile station to receive packet data signals. In a preferred embodiment of the present invention, the active mobility identity is invalidated after one transaction of packet data signals. The active mobile identity may alternatively be invalidated after a short number of such transactions.

One or more of the assigned active mobile identities may be used to indicate a time slot assignment for the active mobile station. The step of transmitting may comprise the steps of: forming a sub-channel feedback field in the packet channel feedback field to indicate acknowledgments; and forming a sub-channel assignment field in the packet channel feedback field to indicate time slot assignments, the sub-channel assignment field being substantially independent of the sub-channel feedback field.

A format of the sub-channel feedback field may depend on whether it is in response to a contention access or a reserved access. The sub-channel feedback field may comprise an active mobile identity that indicates acknowledgment in response to a contention access.

In accordance with another aspect of the present invention, a method for transmitting packet data signals in a time slotted packet channel is provided. The method comprises the steps of: creating sub-channel time slots associated with the time slotted packet channel; defining an active mobile identity associated with an active mobile station; and identifying acknowledgments using the active mobile identity.

In accordance with yet another aspect of the present invention, a communication device, such as a mobile station, for communicating via packet data signals over a packet channel is provided. A sub-channel controller identifies acknowledgments and assignments of time slots on the packet channel based on a packet channel feedback field. A channel access manager controls access to the packet channel based on the acknowledgments and assignments. The sub-channel controller may identify acknowledgments based on the packet channel feedback field and a active mobile identity associated with the communication device.

These and other features and advantages of the present invention will become apparent from the following detailed description, the accompanying drawings and the appended claims.

BRIEF DESCRIPTION OF THE DRAWINGS

The foregoing and other advantages of the invention will become apparent upon reading the following detailed description and upon reference to the drawings in which.

DETAILED DESCRIPTION OF THE INVENTION

Figure 1:
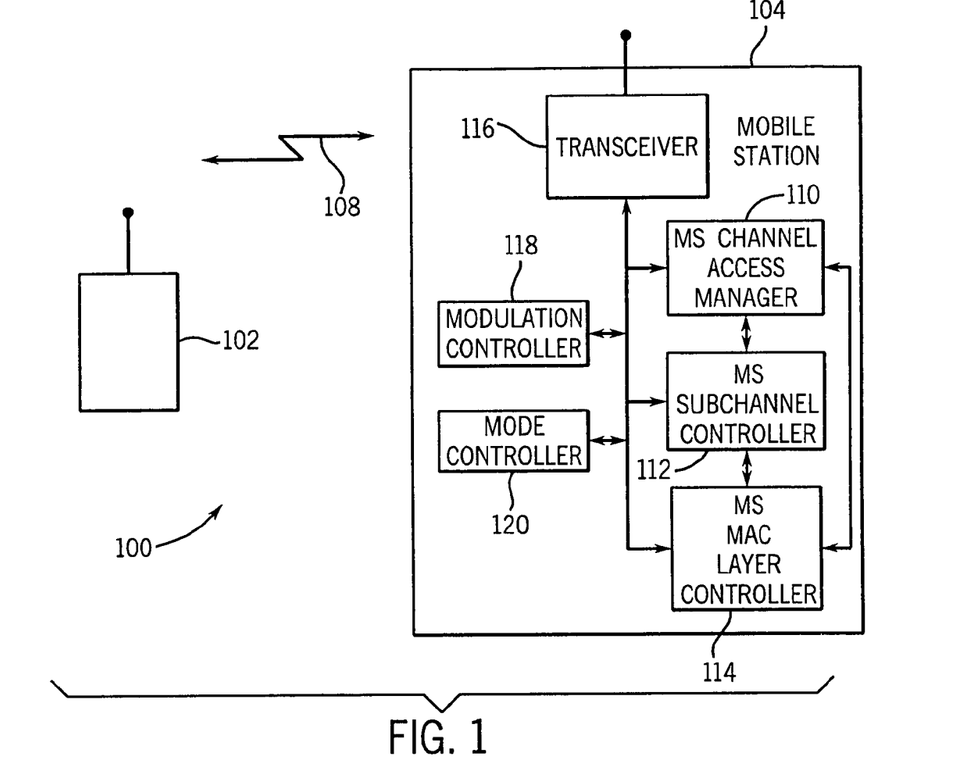
FIG. 1 is block diagram of a communications system in accordance with the present invention in which the method of the present invention may be advantageously implemented.

In accordance with the present invention, a wireless communications system 100 is shown in FIG. 1 in which the method of the present invention may be advantageously implemented. The system 100 comprises communication devices, such as a base station (BS) 102 and a mobile station (MS) 104. Although only one base station and mobile station are shown in FIG. 1, those skilled in the art will readily comprehend that there are typically multiple base stations and mobile stations in a wireless communications system. The BS 102 transmits and receives signals, such as packet data units (PDUs), to and from the MS 104 over a communication channel, shown generally at reference numeral 108.

A MS channel access manager (CAM) 110 controls access of the MS 104 to the communication channel 108. As described more fully below, a MS Subchannel Controller 112 processes PDUs for transmission over the channel 108 and recovers PDUs from the physical layer of received signals and sends them to the CAM 110. A Media Access Control Layer Controller (MLC) 114 controls communications on the media access control layer. A transceiver 116 transmits PDUs to and receives PDUs from the base station 102.

A modulation controller 118 selects a modulation format in which the packet data signals will be formatted. A mode controller 120 selects either an incremental redundancy mode or a fixed coding mode for transmission. Advantageously as set forth more fully below, the system 100 may select modulation formats and modes for each time slot of the packet data signals. It should be understood that although the various controllers are shown located in the mobile station 104, the base station 102 has similar controllers. However, the base station controller would need additional, or slightly different, functions than the mobile station controllers. For example, the base station 102 must multiplex multiple mobile stations.

The present invention is generally directed to improved media access control (MAC) and Radio Resource Management (RRM) in cellular packet communications. Although the present invention will be described primarily with reference to packet communications over IS-136 channels, principles in accordance with the present invention may be implemented in any number of packet communication systems.

In accordance with the present invention, a MAC function comprises various procedures, such as packet data channel (PDCH) selection, reassignment and reselection. During these processes, mobile stations are directed to a PDCH through IS-136 digital control channel (DCCH) broadcast information. If there are multiple PDCHs per sector, mobile stations are directed to a Beacon PDCH. Broadcast information on the Beacon PDCH indicates the number of PDCHs, as well as the bandwidth (full-rate, double-rate or triple-rate) of each support PDCH. Mobile stations then hash on to a particular PDCH depending on their identity and the number of PDCHs.

Load balancing may be carried out by reassigning mobile stations across radio resources and performance may be further improved by maintaining MAC/Radio Link Protocol (RLC) state across reassignments. Cell reselection procedures ensure continuity of service across cell boundaries since mobile stations autonomously perform PDCH reselection when they detect a stronger signal from a neighbor cell.

In accordance with the present invention, Active Mobile Identity Management (AMIM) is implemented. In AMIM, each mobile station is assigned a temporary local identifier, preferably consisting of seven (7) bits, designated as an active mobile identity (AMI) field which remains valid for one or several closely spaced transactions. The AMI is used to identify uplink time slot assignments and to identify a recipient of data on the downlink. Of the 128 possible AMI field values, preferably only 89 values are permitted for mobile stations engaged in point to point transactions. By restricting the allowed values of the AMI, the reliability of the transmitted coded version of the field is improved. One or more, or a subset, of the active mobile identities may therefore be used for special functions and not for mobile station identification.

AMI assignment procedures are preferably executed for both uplink and downlink transactions spanning more than one time slot. If a valid AMI has not already been assigned, the AMI assignment is carried out as a part of a transaction initiation procedure. Once an AMI has been assigned to a mobile station, it is used for transactions in both uplink and downlink directions.

The present invention provides a procedure for transaction initiation. A new transaction is initiated by a transmit controller when a transmission opportunity is identified and if a transmit buffer contains new data. Downlink transactions may be acknowledged or unacknowledged but uplink transactions are always acknowledged. The initiation of a new transaction is carried out through the transmission of a BEGIN Protocol Data Unit (PDU). The acknowledged transfer of the BEGIN PDU is used to initialize the AMI and a RLP protocol in either Incremental Redundancy (IR) Mode or Fixed Coding (FC) Mode for the transaction.

In accordance with the present invention, the RLP operates in two modes: incremental redundancy (IR) and fixed coding (FC) modes. For both modes, the retransmission scheme is based on a TDMA circuit data RLP as set forth in IS-136. Under IS-136, retransmissions are given priority over new data and retransmissions are determined by the transmitter based on receiver-state feedback (bitmap feedback). Retransmissions are not based on timers or an accurate knowledge of the round-trip delay. Extensions to the RLP as set forth in IS-136 have been defined for operation at the MAC layer for packet data transactions, with modulation adaptation, and using the incremental redundancy mode.

Seamless operation across adaptive modulation is achieved through the use of fixed size data and parity blocks in the IR mode and fixed size coded data segments in the FC mode. Different integer number of these fixed size blocks or segments can be accommodated in the MAC PDU for different modulations.

An uplink MAC procedure using a generic packet channel feedback (PCF) field is provided in the present invention. The PCF uses a minimal set of flags which are defined to provide acknowledgments and assignments on sub-channels (time slots) associated with the PDCH. The PCF allows the efficient management of contention access and reserved access on the same channel. The flags are coded according to the reliability needed for the functions being carried out. A more detailed discussion of the PCF in accordance with the present invention is provided below.

MAC PDUs transmitted on the uplink are acknowledged via the PCF mechanism. Optionally, full or partial bitmap feedback may be provided by the base station via ARQ Status PDUs. The transmitter may poll the receiver for bitmap feedback at any time. For downlink data transfer, the base station may provide the mobile station with reservation opportunities to obtain bitmap feedback. Local variables and tables maintained at the transmitter and receiver contain the update procedures and a detailed description of the protocol using the Specification and Description Language (SDL) and are part of the MAC layer specification.

In accordance with the present invention, a procedure for contention access is provided. Contention slots are provided on the PDCH in order to allow mobile stations to initiate packet data transactions. A mobile station identifies a contention opportunity by reading the PCF field. If the mobile station attempts transmission in a contention slot and is negatively acknowledged by the base station, it starts a timer and waits for an AMI and/or mode assignment from the base station. AMI assignment may be provided by the base station 102 through a downlink ARQ Status PDU. If no AMI or mode assignment is received and the timer expires, the mobile station must wait for T_Retry idle (contention) slots before making another access attempt.

The parameters used by such a random access procedure in accordance with the present invention are set forth in Table 1.

TABLE 1

| Parameter | Description |
|---|---|
| Access_Count_Max | Maximum number of access attempts before declaring failure. |
| Access_Count | Counter for number of contention access attempts. |
| T_Retry | Number of contention slots that the mobile station must wait before another transmission attempt. |
| T_Retry_Init | Initial value of T_Retry_Max. |
| $\alpha$ | Configurable parameter. |

T_Retry is a uniformly distributed integer in the closed interval [0, T_Retry_Max] where T_Retry_Max is determined as a function of Access_Count, T_Retry_Init and $\alpha$. The parameter T_Retry_Max may be computed using the expressions in Table 2.

TABLE 2

| Access_Count | T_Retry_Max |
|---|---|
| 0 | 0 |
| 1,2, . . . ,Access_Count_Max | T_Retry_Init $(2)^A$ <br> A = (Access_Count − 1)/$\alpha$ |

The access parameters, the Access_Count_Max, T_Retry_Init and the $\alpha$ are optionally transmitted over a fast packet broadcast control channel (F-PBCCH). If these values are not indicated, the default values in Table 3 below may be assumed.

TABLE 3

| Parameter | Default Value |
|---|---|
| Access_Count_Max | 5 |
| T_Retry_Init | 6 |
| $\alpha$ | 1.5 |

If the mobile station 104 is unsuccessful after (Access_Count_Max+1) access attempts, the CAM 110 provides an access failure indication to the MLC 114. In the transmit direction, the Subchannel Controller 112 processes Coded_MAC_PDUs for transmission over the radio interface. In the receive direction, the Subchannel Controller 112 recovers the Coded_MAC_PDUs from the physical layer and sends them to the CAM 110.

Figure 2A:
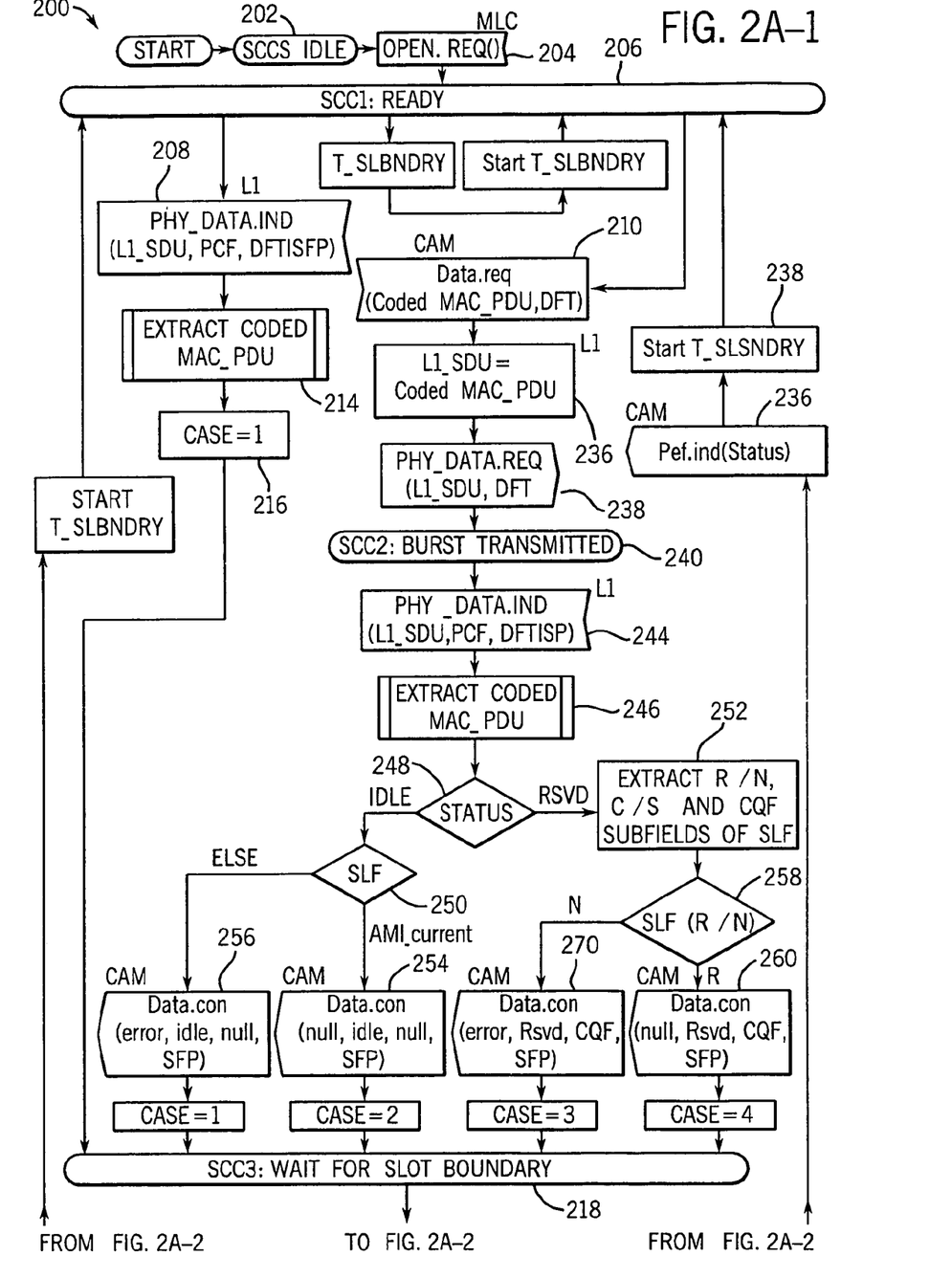
FIGS. 2A and 2B are a flowchart of a process performed by a mobile station Subchannel Controller (SCC) in accordance with the present invention relating to contention access.
Figure 2A:
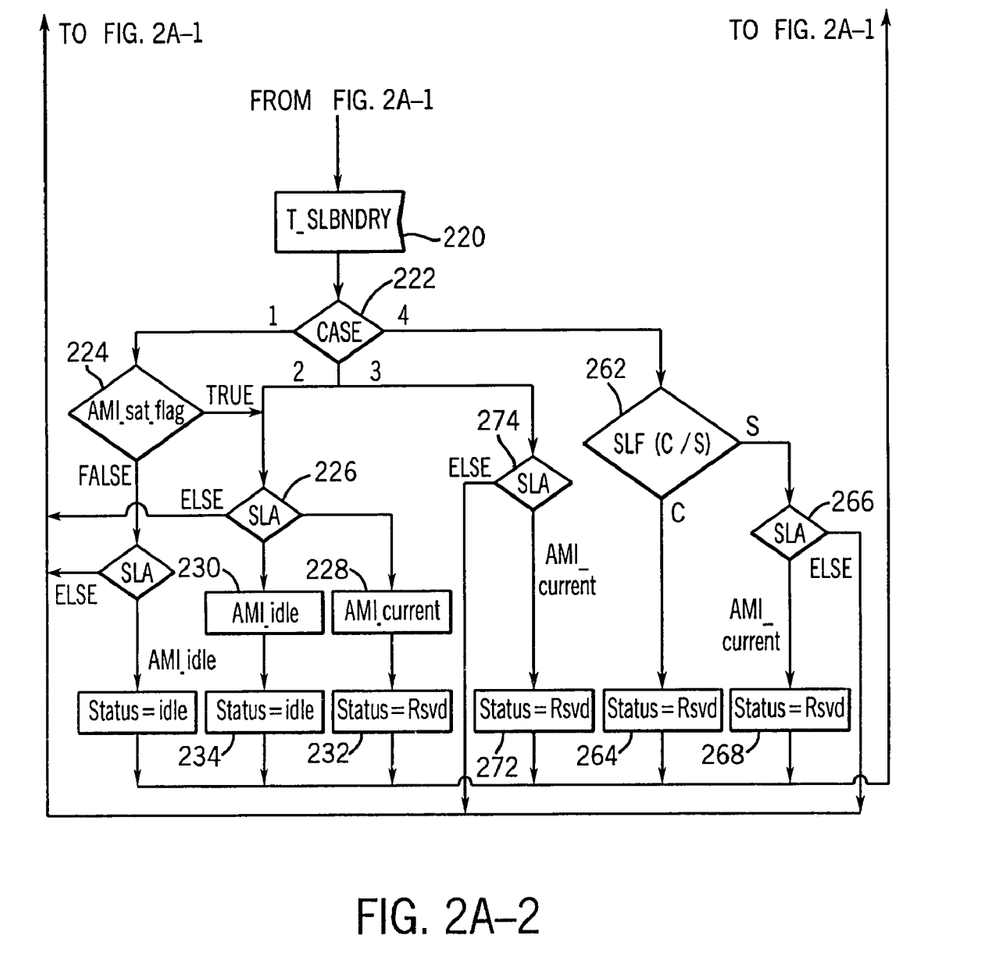
Figure 2B:
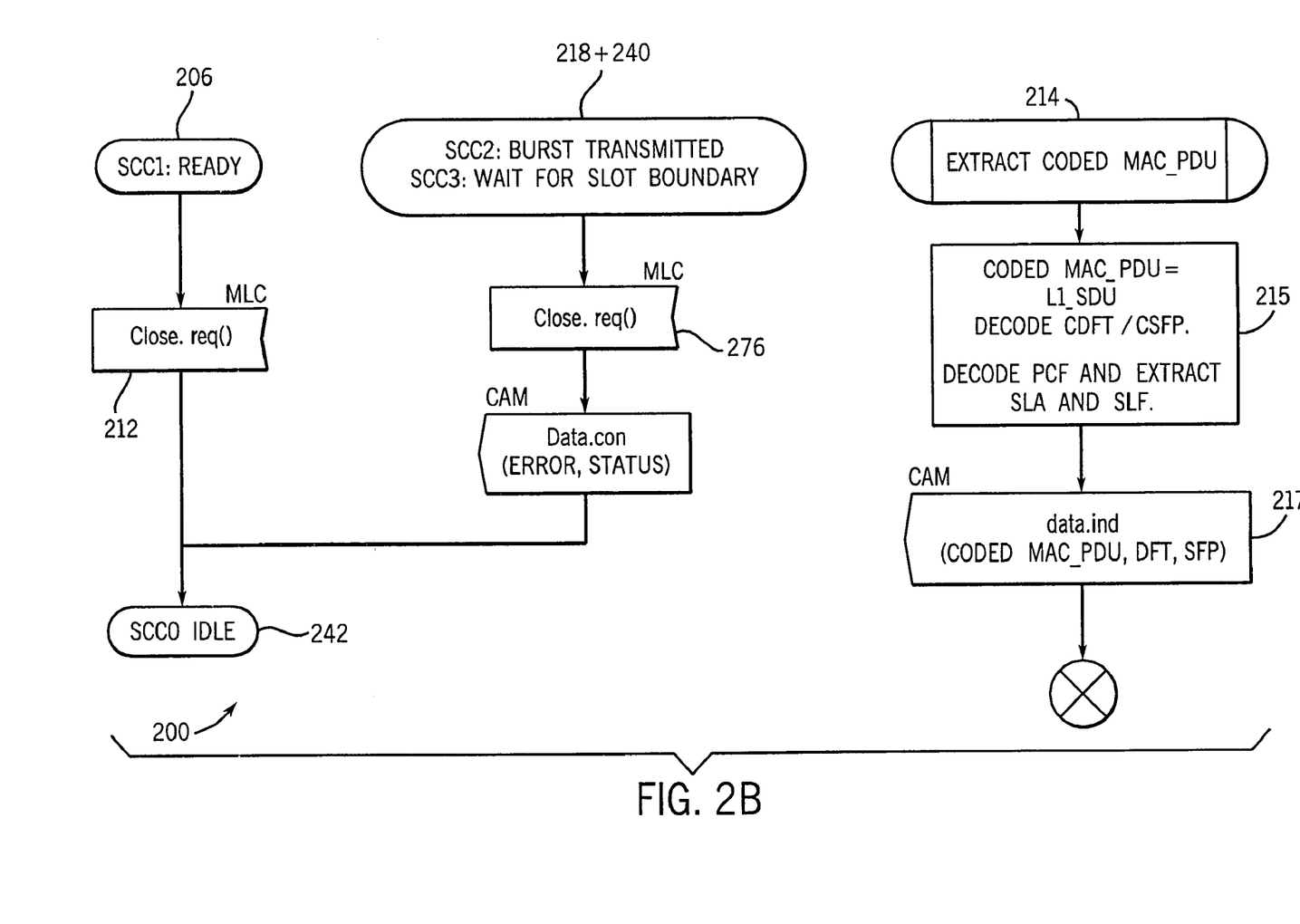

The mobile station Subchannel Controller (SCC) 112 may perform a process 200 shown in FIGS. 2A and 2B. A base station Subchannel Controller performs a similar process. The following variables and timers set forth in Table 4 are used in FIGS. 2A and 2B:

TABLE 4

| Variable | Values | Description |
|---|---|---|
| AMI_current (Global) | AMI_idle, AMI values | Mobile station's AMI value. |
| AMI_idle | 0 | Default AMI value corresponding to contention slot assignment or point to multipoint slot assignment. |
| AMI_set_flag (Global) | True, False | Indicates whether a valid AMI has been assigned to the mobile station. |
| C/S | Continue, Stop | Indicator of whether this mobile station continues to have next time slot reserved for it. |
| Case | 1,2,3,4 | Variable to provide temporary decision switch. |
| Coded_MAC_PDU | Data | Encoded data for transmission. |
| DFT | 0,1, . . . ,4 | Data Frame Type. Indicates mode, modulation and AMI type. |
| Error | Error, Null | Error identifier. |
| L1_SDU | Data | Data from PDU from L1 Interface. |
| MAC_PDU | Data | PDU Data. |
| PCF | (SLA (AMI or [R/N, C/S, CQF]), SLF) | Packet channel feedback data. |
| Quality_Rx | CQF, Null | Quality factor received. |
| R/N | Received, Not Received | Status of reception success for preceeding timeslot. |
| SFP | 0,1,2, . . . ,31 | Super Frame Phase indicator. |
| SLA | AMI_idle or AMI value | Slot Assignment indicator. Identifies AMI assigned for next slot. |
| SLF | AMI or [R/N, C/S, CQF] | Slot Feedback flag. |
| Status | Idle, Rsvd | Status of next slot. Idle: next slot available for contention access. Rsvd: next slot reserved for current mobile station. |
| T_SLBNDRY | timer | Timer which expires on time slot boundary when transmission must start for the corresponding SCC. |

The MAC Layer has 9 Sub-channel Controllers for a triple rate channel, 6 for a double rate channel and 3 for a full rate channel. Each SCC handles PCF operation for the sub-channel and passes coded MAC PDUs between the CAM and the Physical Layer.

The mobile station SCC may be in one of three states: SCC0 (Idle), SCC1 (Ready) and SCC2 (Burst Transmitted). The primitives exchanged by SCC for each SCC state are set forth in Table 5.

Referring now to FIGS. 2A and 2B, from idle state SSC0 at step 202, the SCC transitions to state SCC1 on receiving an Open.req primitive from the MLC at step 204. While in the SCC1, or Ready, state at step 206, the SCC may receive one of the following primitives:

At step 208, a PHY_DATA.IND primitive from the Physical Layer (Layer 1) which includes a Layer 1 SDU, PCF, DFT and AMI.

At step 210, a Data.Req primitive from the CAM which includes a Coded MAC PDU and the DFT.

At step 212, Close.Req primitive from the MLC.

TABLE 5

| SCC State | Input Signals | Output Signals |
|---|---|---|
| SCC0 (Idle) | Open.Req from MLC Close.Req from MLC | |
| SCC1 (Ready) | PHY_DATA.IND from Layer 1 Data.Req from CAM Close.Req from MLC | pcf.ind(Status) to CAM data.ind to CAM PHY DATA.REQ to Layer 1 |
| SCC2 (Burst Transmitted) | PHY_DATA.IND from Layer 1 Close.Req from MLC | pcf.ind(Status) to CAM data.ind to CAM Data.con to TC |

On receiving a PHY_DATA.IND primitive, the SCC does the following (in order):

It executes the procedure titled "Check Destination and Extract Coded MAC PDU" at step 214 and also shown in FIG. 2B. As part of this procedure, the PCF, DFT and AMI fields are decoded, and the coded MAC PDU is extracted from the Layer 1 SDU (L1_SDU) at steps 215 and 217. At step 216, if the assigned AMI (AMI_current) matches the recipient AMI or if the recipient AMI is point to multi-point (AMI_idle), the SCC uses a data.ind primitive to pass the Coded MAC PDU and DFT to the CAM at step 218.

The SCC then checks the SA field for a transmission opportunity at steps 220 and 222. At step 224, on obtaining a reserved access opportunity (AMI_set_flag=True and SA=AMI_current at steps 226 and 228) or a contention opportunity (SA= AMI_Idle) at step 230, the SCC sets Status=Rsvd at step 232 or Status=Idle at step 234 respectively, and indicates the transmission opportunity to the CAM using a pcf.ind(Status) primitive at steps 236 and 238.

On receiving a Data.req primitive at step 210 from the CAM, the SCC executes a procedure which constructs the L1_SDU at step 236, encodes the AMI and DFT at step 238. The SCC then provides the L1_SDU, AMI and DFT to the Physical Layer through a PHY_DATA.REQ primitive and enters the SCC2 state at step 240. On receiving a Close.Req primitive, the SCC transitions to the SCC0 state at step 242.

While in the SCC2 state, the SCC may obtain a PHY_DATA.IND primitive from the physical layer at step 244 or a Close.Req primitive from the MLC. On receiving the PHY_DATA.IND primitive, the SCC does the following (in order):

At step 246, it executes the procedure titled "Check Destination and Extract Coded MAC PDU." As part of this procedure, the PCF, DFT and AMI fields are decoded, and the coded MAC PDU is extracted from the Layer 1 SDU (L1_SDU). If the assigned AMI (AMI_current) matches the recipient AMI or if the recipient AMI is point to multi-point (AMI_idle), the SCC uses a data.ind primitive to pass the Coded MAC PDU and DFT to the CAM.

At step 248, the SCC assumes a different structure for SF depending on whether the previous burst was transmitted in a contention slot (SF=Idle) or a reserved slot (Status=Rsvd).

If Status=Idle, the SCC goes to step 250 and does the following:
On receiving an ACK (i.e., SF=AMI_current), at step 254, it provides a Data.con primitive to the TC in order to validate the AMI. It then checks SA to determine if it has been granted a reservation opportunity. The SCC sets Status=Idle or Status=Rsvd depending on whether SA=AMI_idle or SA= AMI_current (if the AMI is valid).

On declaring a NAK (i.e., SF not equal to AMI_current), the SCC provides a Data.con error indication at step 256 to the TC. The SCC sets Status=Idle or Status=Rsvd depending on whether SA=AMI_Idle or SA=AMI_current (if the AMI is valid).

If Status=Rsvd at step 248, the SCC extracts the R/N and C/S flags from SF at step 252 and does the following:
On receiving an ACK (i.e., R/N=R) at step 258, the SCC provides a Data.con primitive to the TC and then reads the C/S indicator to determine if it can transmit in the subsequent slot at step 260.

At step 262, on decoding C/S as CONTINUE, the SCC ignores the SA field and sets Status=Rsvd at step 264.

On decoding C/S as STOP at step 262 and SA=AMI_current at step 266, the SCC sets Status=Rsvd at step 268.

On receiving a NAK (i.e., R/N=N) at step 258, the SCC provides a Data.con error indication to the TC at step 270 and sets Status=Rsvd at step 272 if SA= AMI_current at step 274.

The SCC indicates a reserved access or contention access opportunity to the CAM using a pcf.ind(Status) primitive at step 236.

If the SCC is in state SCC2 at step 216 or SCC3 at step 240, on receiving a Close.Req primitive at step 276, the SCC the SCC provides a Data.con error indication at step 278 and transitions to the SCC0 state at step 242.

The present invention provides adaptive modulation of the signals transmitted over the PDCH. Fixed coding and incremental redundancy (IR) Radio Link Protocols (RLPs) rely on adaptive modulation to achieve the best throughput under delay constraints. The RLP segments or blocks are chosen to be of fixed length and a variable integral number of segments or blocks are packed into a MAC PDU depending on the modulation. This configuration ensures that segments or blocks transmitted using a particular modulation can be retransmitted, even if the modulation has changed.

A receiver unit, either the base station 102 or the mobile station 104, provides periodic channel quality feedback (CQF) which indicates the maximum constellation size (and thus the modulation scheme) allowable under the prevailing channel conditions. The transmitter uses the CQF along with knowledge of the offered load in order to carry out modulation adaptation. The modulation and coding mode for the data in each time slot are indicated to the receiver through a separately coded field called the Coded Data Field Type (CDFT). The data field type (DFT) field is in the MAC layer. The DFT is a 3 bit field indicating the mode (FC or IR) and modulation ($\pi/4$-DQPSK or 8-PSK) of the DATA fields in each time slot, and also whether the DATA fields are associated with the broadcast or non-zero (mobile station specific) AMI. As will be discussed, the DATA field may be transmitted using $\pi/4$-DQPSK or 8-PSK.

Use of the DFT/CDFT permits efficient multiplexing of IR mode and fixed coding mode transactions with dynamic (slot by slot) modulation switching without causing ambiguity at the receiver. The mode indication allows fixed coded slots to be interspersed between IR slots. This permits, for example, expedited control/feedback frames to be transmitted in fixed coding mode while an incremental redundancy mode transaction is in progress. The modulation type indication enables slot-by-slot adaptation. The indication of mode and modulation in each time slot facilitates quick detection of handshake failures and recovery action. Only 5 values for the DFT are currently used under present standards; additional DFT values may be used for the support of FC and IR with 16-level modulation.

On the uplink, the DFT field is encoded using a (6,3) code to form the CDFT. On the downlink, the DFT is combined along with a 5 bit Superframe Phase (SFP) and the resulting 8 bit word is encoded using a (12,8) code to obtain a CSFP/CDFT field. The mobile station can improve its DFT error performance by using its prior knowledge of SFP for each time slot.

The receiver MAC layer provides the CQF which indicates the modulations that are allowable under the prevailing channel conditions. Table 6 sets forth CQF values on uplink and downlink. Thresholds $\theta_L$ and $\theta_H$ are broadcast parameters. Currently, only one threshold is required in practical applications, since a 16-level modulation has yet to be standardized. However, those skilled in the art will readily comprehend with the benefit of this disclosure that multiple thresholds may be required for different modulations.

TABLE 6

| Channel Conditions | CQF | Allowable Modulations |
| --- | --- | --- |
| $S/(I + N) < \theta_L$ | 00 | π/4-DQPSK |
| $\theta_L < S/(I + N) < \theta_H$ | 01 | π/4-DQPSK, 8-PSK |
| $S/(I + N) > \theta_H$ | 10 | π/4-DQPSK, 8-PSK, 16-level |
| — | 11 | Reserved |

Table 6 shows a scheme in accordance with the present invention for determining the maximum allowable constellation size based on a signal to interference plus noise ratio, S/(I+N), estimated at the input to the decoder. The downlink adaptation thresholds, $\theta_L$ and $\theta_H$, are configurable as broadcast parameters, and S/(I+N) estimation may be carried out using any known techniques, such as the technique disclosed in "Channel Quality Estimation Over Mobile Radio Channels With Applications," Proceedings, Conference on Information Sciences and Systems, Princeton, March 1998, by Balachandran et al.

On the downlink, the CQF is transmitted as part of the PCF. On the uplink, CQF is transmitted as a part of a supervisory ARQ Status PDU. A valid CQF may be used along with the offered load to change the downlink modulation.

In accordance with the present invention, the RLP supports operation in IR mode. The IR RLP achieves higher throughput since redundant bits are transmitted only when necessary. The IR mode requires more memory at the receiver but typically achieves 20–25% more throughput than the FC mode depending on the region of operation. The IR mode is generally used only for regular data transfer and not the transfer of expedited control information.

A BEGIN PDU is used for initializing a transaction, and subsequent data transfer is carried out through the transmission of a series of CONTINUE PDUs. Each transaction may be bounded or unbounded, and unbounded transactions may either be gracefully ended or aborted on detecting protocol violations. Supervisory ARQ Status PDUs are used to periodically provide the peer transmission controller with knowledge about the receiver state.

Figure 3:
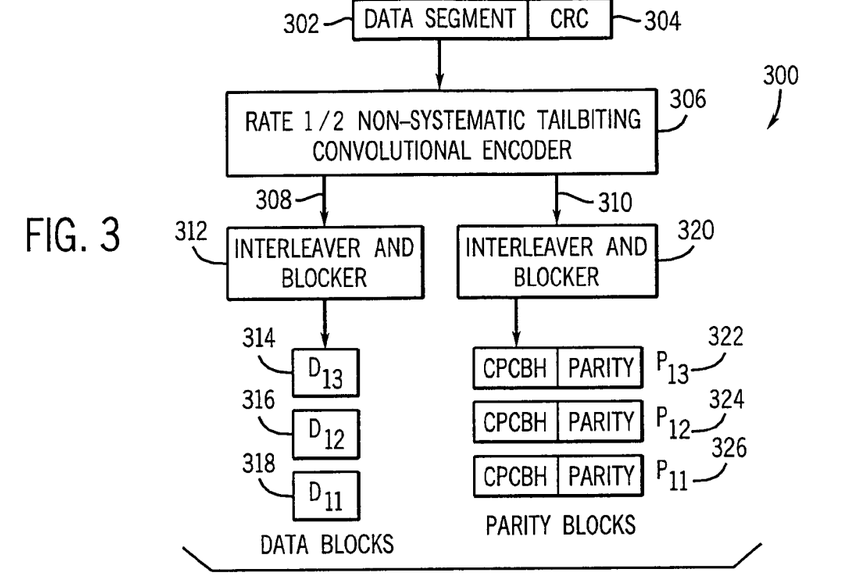
FIG. 3 illustrates a method for incremental redundancy segment encoding for transmitting data in the communication system of the present invention.

In IR mode, a process 300 for mapping of data segments to data and parity blocks is shown in FIG. 3. The byte stream derived from upper layer data is segmented into fixed length RLP segments 302 of length L. A CRC sequence 304 computed over the data is added to each RLP segment 302. The data and CRC sequence 302 and 304 are encoded using a rate ½, 32 state, tailbiting, non-systematic, maximal free distance convolutional encoder with octal generators (53,75) 306. The rate ½ convolutional encoder has 2 outputs, one output is suitably punctured, as discussed below. Without loss of generality, the unpunctured encoder output 308 is referred to as data and the punctured output 310 is referred to as parity. In reality, the data output 308 contains no redundancy and represents a one-to-one mapping to the actual data.

The data bits at the output of the encoder are interleaved and segmented into D blocks of length L/D at 312. These blocks are called data blocks 314, 316 and 318 and denoted by $D_{ij}$ (j=1,2, . . . ,D). Of the L parity bits at the encoder output, Dh parity bits are punctured and the remaining parity bits are segmented at 320 into D parity blocks 322, 324 and 326 of equal size denoted by $P_{ij}$ (j=1,2, . . . ,D). Here h is the size of the header required for each parity block. At the receiver, soft information from data and parity blocks corresponding to the same segment is combined for decoding. The output bits of the encoder are mapped in an interleaved manner to maximize code/time diversity.

A 10-bit block sequence number (BSN) is assigned to each data and parity block. The same BSNs are reused for data and parity blocks, since data/parity blocks are explicitly identified in a CONTINUE PDU. To each parity block, a separately coded parity/control block header (PCBH) is added that contains a 1 bit PCBH header type ("1" for parity block) and the BSN. The PCBH is encoded using a punctured rate ½ convolutional code.

Figure 4:
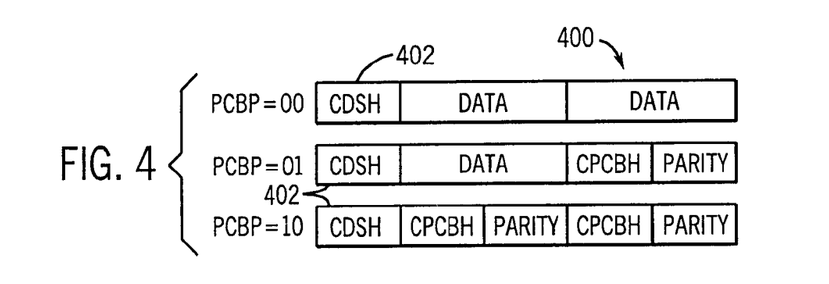
FIG. 4 shows a composition of an incremental redundancy CONTINUE packet data unit for π/4-DQPSK modulation.
Figure 5:
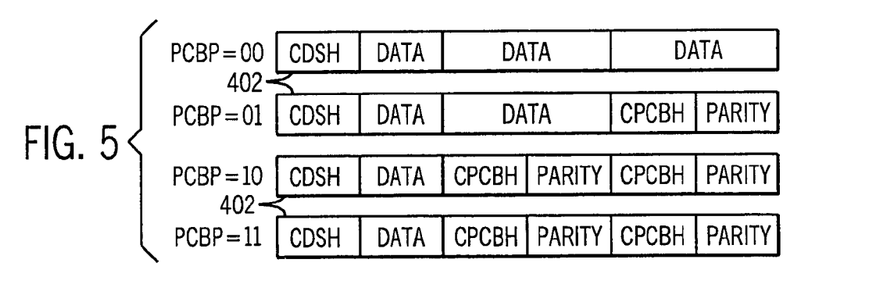
FIG. 5 illustrates a composition of an incremental redundancy CONTINUE packet data unit for 8-PSK modulation.

Each CONTINUE PDU carries 2, 3 or 4 (combinations of data and parity/control) blocks corresponding to the use of 4-level, 8-level or 16-level modulation respectively. FIGS. 4 and 5 show CONTINUE PDU 400 formats as a function of the modulation type. FIG. 4 shows formats for the CONTINUE PDU 400 for π/4-DQPSK modulation and FIG. 5 shows formats for the CONTINUE PDU 400 for 8-PSK modulation.

Figure 6:
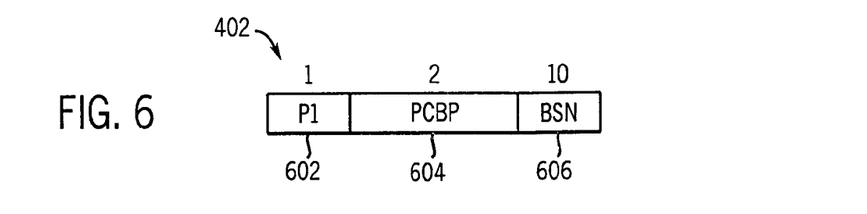
FIG. 6 shows a structure of a data segment header showing a number of bits required for each of the fields in the header.

A separately Coded Data Segment Header (DSH) 402 is added to form each CONTINUE PDU. FIG. 6 shows the DSH 402 containing a 1 bit Poll Indicator (PI) 600 to request bitmap feedback, a 2 bit Parity/Control Block Pointer (PCBP) 602 to indicate the composition of the PDU 400 in terms of data and parity/control blocks, and a 10 bit BSN 604 associated with the first data block in the PDU 400. Data blocks in each CONTINUE PDU 400 are required to be in sequence.

A 12 bit CRC sequence is added to the 13 bit DSH 402, and the resulting 25 bit frame is encoded using a punctured, tailbiting, non-systematic, 32 state, rate ½ convolutional code to obtain a coded DSH, or CDSH. The CRC sequence may be computed using the assigned AMI and an abbreviated digital verification color code in order to identify the mobile station and base station respectively. IR operation can benefit if the transmitter is provided ACK/NAK status of data blocks in addition to the ACK/NAK status of RLP segments. Additional ARQ status formats are defined for this purpose.

In accordance with the present invention, the RLP supports a Fixed Coding (FC) Mode. In the FC mode, NLP segments are of fixed length, generally shorter than the IR mode RLP segment. The CONTINUE PDU carries 2, 3 or 4 RLP segments depending on the use of 4-level, 8-level or 16-level modulation respectively. A CONTINUE PDU Header and a 16 bit CRC sequence computed over the data segments of the RLP and the Header. The Header includes a bit indicating the PDU type, a Poll Indicator bit, a 10 bit BSN of the first data segment in the PDU, and a bit indicating whether the PDU contains LLC data or expedited control information.

The PDU is encoded using a punctured, 32 state, rate ½, tailbiting, non-systematic convolutional code. The puncturing (coding rate) at each modulation has been determined from the number of RLP segments and the number of transmission symbols available for the modulation format.

In accordance with the present invention, time slot formats are defined to provide both IR and FC mode operation. The 30 kHz spectrum usage, symbol rate and TDMA format (6 time slots every 40 ms) are maintained as in the IS-136 standard in order to minimize impact on existing infrastructure. The time slot format contains new fields that support PDCH functions.

Figure 7:
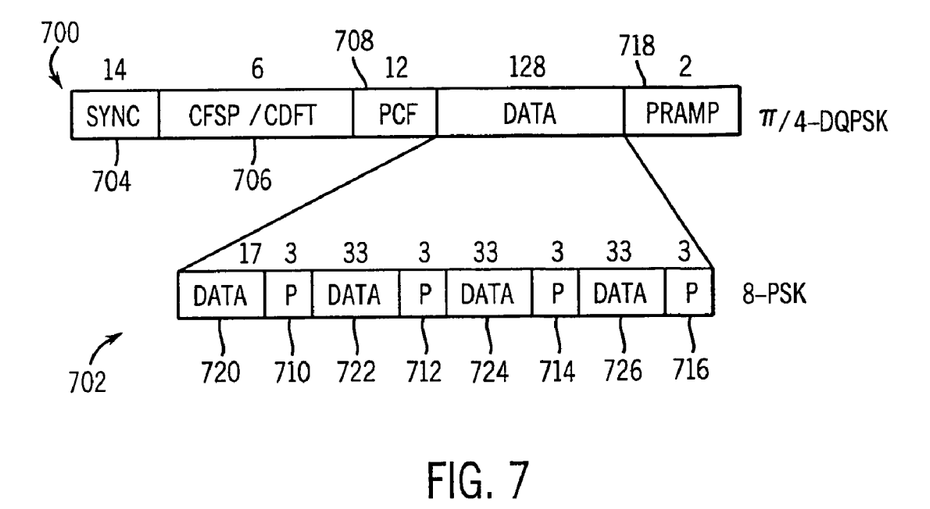
FIG. 7 shows a downlink time slot format.
Figure 8:
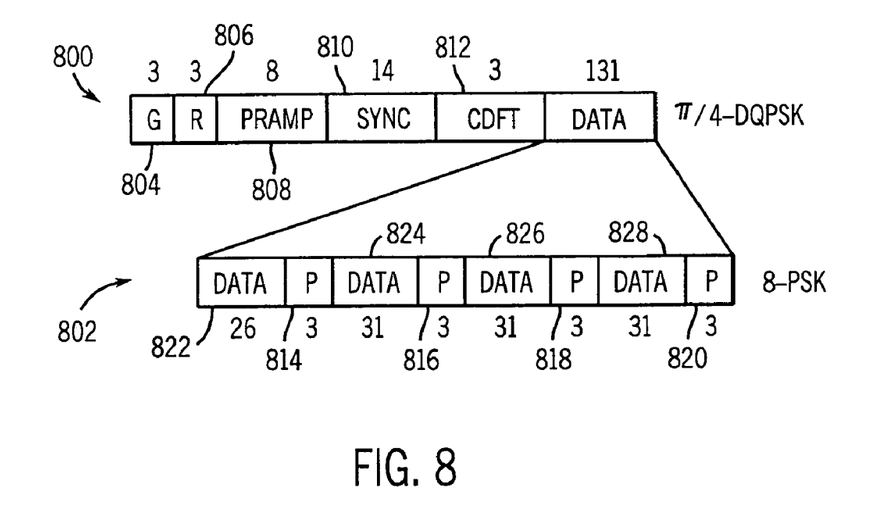
FIG. 8 shows an uplink time slot format.
Figure 9:
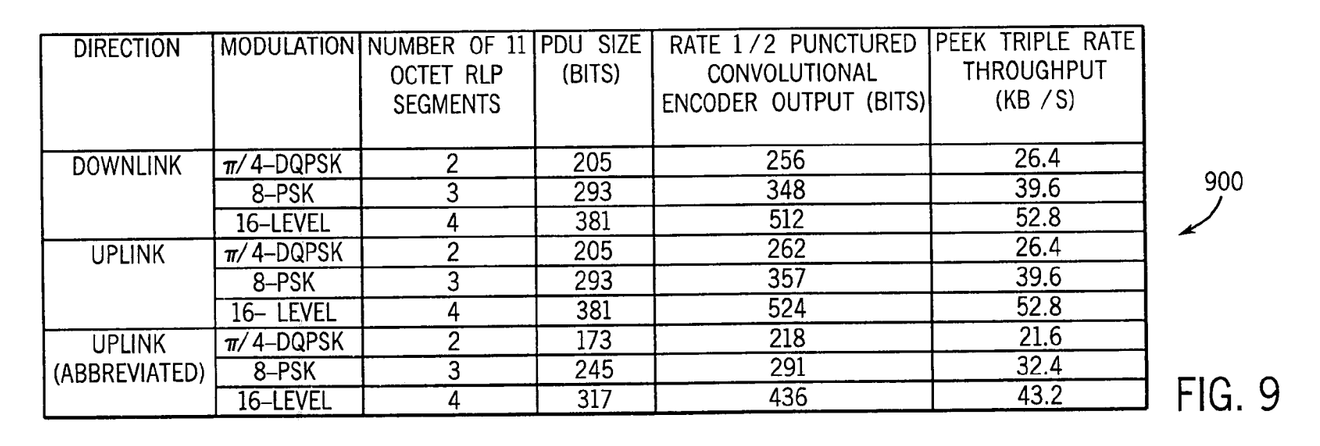
FIG. 9 is a table setting forth FC mode CONTINUE PDU format sizes and corresponding peak triple rate PDCH throughput in kb/s.
Figure 10:
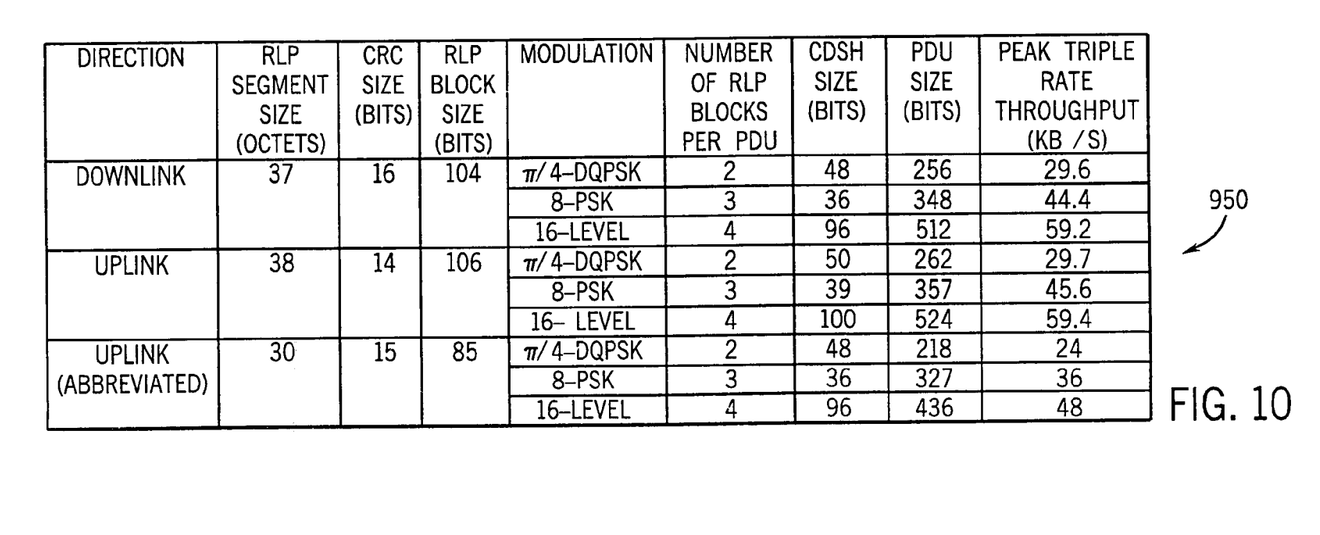
FIG. 10 is a table setting forth IR mode CONTINUE PDU format sizes and corresponding peak triple rate PDCH throughput in kb/s.

Downlink and uplink time slot formats for π/4-DQPSK 700 and 800 and coherent 8-PSK 702 and 802 are shown in respective FIGS. 7 and 8. Fields SYNC 704, CFSP/CDFT 706, PCF 708, G 804, R 806, PREAM 808, SYNC 810 and CDFT 812 are always modulated using π/4-DQPSK. The slot format is identical for both the IR and FC modes. Pilot (P) signals 710, 712, 714, 716, 814, 816, 818 and 820 are provided in order to obtain a phase reference for coherent detection of 8-PSK. A downlink RAMP field 718 facilitates downlink power control for adjacent time slots on the same 30 kHz channel. The Coded Data Field Type (CDFT) 706 and 812 specifies the mode and modulation for DATA fields 720, 722, 724, 726, 822, 824, 826 and 828 in the time slot. FIG. 9 is a table 900 setting forth FC mode CONTINUE PDU format sizes and corresponding peak triple rate PDCH throughput in kb/s. Similarly, FIG. 10 is a table 950 setting forth IR mode CONTINUE PDU format sizes and corresponding peak triple rate PDCH throughput in kb/s.

In accordance with another aspect of the present invention, a generic packet channel feedback (PCF) field 708 is defined in order to provide acknowledgments and assignments on sub-channels (time slots) associated with a time slotted packet channel. The IS-136 based TDMA system defines sub-channels (i.e., forward and reverse link burst associations) in order to allow enough processing time at the base station in connection with a random access attempt.

In the IS-136 packet data channel, a 60 ms roundtrip delay is assumed. This assumption results in 3 sub-channels per full rate channel, 6 sub-channels per double rate channel and 9 sub-channels per triple rate channel. The PCF field 708 is more reliable than the shared channel feedback (SCF) set forth in IS-136 and allows the efficient management of contention access and reserved access on the same channel. The packet data channel associates the 7 bit temporary local identifier, or AMI, with each mobile station engaged in packet data transactions. The AMI serves the same purpose as the CPE on the DCCH and is used to explicitly identify acknowledgments and assignments. A PCF field is associated with each sub-channel in order to acknowledge a transmission on the previous time slot and to assign the next time slot.

Feedback for a previous slot may be an ACK (that explicitly identifies the transmitter for a contention slot) or a NAK. The next slot may be assigned as Idle for contention based access or Reserved for access by a specific transmitter. Compared to the SCF, this approach simplifies the state machine since the acknowledgment for the previous slot and the assignment for the next slot are unambiguously identified. Redundant usage as well as inconsistent or unused combinations are eliminated.

Decoding errors in PCF fields always result in throughput loss, but could result in protocols errors and failures. The reliability requirements of the PCF fields require tradeoffs between overhead and robustness. Consider the following examples: (i) an error in an acknowledgment means that a frame will have to be retransmitted, therefore the probability of error of the ACK directly translates to a loss in throughput; (ii) if a mobile station that is assigned an uplink transmission opportunity decodes the assignment field in error, it will leave the slot unused resulting in a direct loss in throughput; and (iii) false error correction of assignments meant for other users may result in collisions in reserved slots and loss in throughput.

The consequences of errors in a NAK are considerably more serious. If a negative acknowledgment (NAK) for a contention access is interpreted as an ACK, the mobile station may need to timeout and make another access attempt. For a reserved access, misinterpretation of a NAK as an ACK requires higher layer recovery (and consequently has large throughput penalty). Therefore, acknowledgments and assignments may be treated with comparable robustness. However, negative acknowledgments must be provided with greater error protection. Similarly, explicit assignments should be coded reliably to ensure that false error correction is unlikely. Consistent robustness requirements are placed in the encoding of these fields in the present invention so that the throughput impact of error events on any PCF field 708 is comparable.

Figure 11:
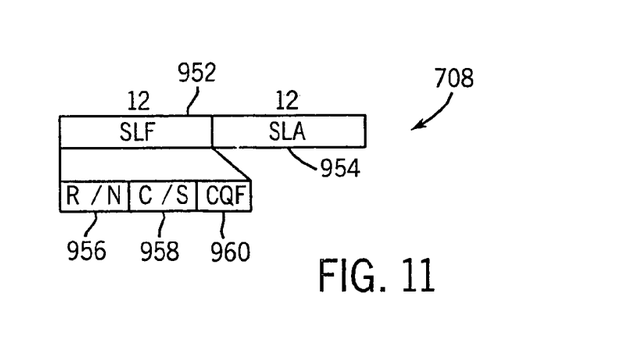
FIG. 11 shows a logical format of a packet channel feedback in accordance with one aspect of the present invention.

FIG. 11 shows a logical format of the PCF field 708 associated with each sub-channel. The main purpose of the PCF field 708 is to acknowledge an access in the previous slot and to assign the next slot to a particular mobile. The acknowledgment and assignment functions may be handled independently for each sub-channel through two logical fields, sub-channel feedback (SLF) 952 and sub-channel assignment (SLA) 954.

In accordance with one aspect of the present invention, the SLF field 952 takes different formats depending on whether feedback is being provided for a contention slot or a reserved slot. The SLF field 952 is comprised of a R/N field 956, a C/S field 958 and a CQF field 960. For reservation based transmissions, the different formats provide greater reliability for acknowledgments (R/N), allow reliable reassignment of the sub-channel to the same user (C/S) and provide uplink CQF to the mobile station 104. Feedback for contention slots is provided through the 7-bit AMI value coded to 12 bits. The all-zero AMI denotes a NAK for a contention slot.

Assignments to successful contending users or users sniffing for reservation based access may be carried out by explicitly identifying the user being assigned the next slot, such as by setting the SLA field 954 to a valid 7-bit AMI value coded to 12 bits. The all-zero AMI value denotes IDLE (contention opportunity). This approach is useful when there are several users on the channel, and sub-channels (time slots) are constantly being assigned to new users. However, with few active users on the channel, sub-channels may constantly be reserved for (reassigned to) the same users. Thus, if there are 3 or fewer users on a full rate channel, a round robin assignment scheme is equivalent to reassigning sub-channels to the same users. Similarly, if there are 9 or fewer users on a triple rate channel, a round robin assignment scheme is equivalent to reserving 1 or more sub-channels for each user. In such cases, it is possible to provide a series of reservation based transmission opportunities, independently, on each sub-channel through the use of the C/S flag. It is possible to reserve sub-channels for some users and carry out round robin assignments for other sub-channels.

In IS-136, BUSY is one of the assignment flag values assumed by the Busy/Reserved/Idle (BRI) field; other flag values consist of RESERVED which indicates assignment to a specific mobile station when qualified by the CPE, and IDLE which indicates a contention slot. The CONTINUE indication is similar to BRI=BUSY but is encoded more robustly. Since the CONTINUE (or BUSY) indication is associated with feedback for a reserved slot and is relevant only to the user who transmitted on the previous time slot on a particular sub-channel, the C/S flag is included in the SLF field.

The 12-bit SLF field 952 is used for acknowledging bursts in the previous slot. For feedback corresponding to contention slots: SLF equals a valid coded AMI provides an implicit acknowledgment to the mobile station with that coded AMI (suggested or assigned) and SLF equals E-NAK provides an explicit negative acknowledgment to all mobile stations which attempted access. The (12,7) code described below may be used to encode the SLF field 952. The all zero codeword is reserved for indicating an explicit negative acknowledgment (E-NAK) to all mobile stations which attempted contention access.

For feedback corresponding to reserved slots, the SLF field 952 is further divided into the following:

R/N field 956 (5 bits): A (5,1) repetition code is used. A '1' indicates that the transmission was Received or R, while a '0' indicates that the transmission was Not Received, or N. The mobile station declares R/N=R if the Hamming weight of the received 5 bit word is strictly greater than 3, otherwise it declares R/N=N.

C/S field 958 (5 bits): A (5,1) repetition code is used to encode this flag. A '1' indicates CONTINUE, or C i.e., the mobile station is assigned the subsequent time slot on the same sub-channel. A '0' indicates STOP or S, i.e., the mobile station must read the SLA field 954 to determine subsequent assignments on that sub-channel. The mobile station declares C/S=C if the Hamming weight of the received 5 bit word is strictly greater than 2, otherwise it declares C/S=S.

CQF field 960 (2 bits): This field provides feedback on uplink channel quality to the mobile station. A mobile station capable of operation on multiple modulations can use this feedback to propose a different modulation for subsequent reservation based transmission opportunities.

The 12-bit SLA field 954 can take the following values:
SLA=valid coded AMI assigns the sub-channel to a mobile station with that coded AMI.
SLA=IDLE identifies a contention opportunity.

The (12,7) code described below is preferably used to encode the SLA field 960. The all zero codeword is used as an IDLE indicator (i.e., to indicate a contention slot).

Each mobile station is assigned a 7 bit AMI value for the duration of each transaction. The AMI assignment is initiated by an uplink or downlink transaction, whichever begins first. The details of AMI assignment and release are described in "GPRS-136 Medium Access Control", TIA January 1998.

The 7 bit AMI may be encoded using a (12,7) code as described in commonly owned U.S. patent application Ser. No. 09/517,911, entitled "METHOD AND SYSTEM FOR CODING INFORMATION SEQUENCES WITH UNEQUAL ERROR PROTECTION IN COMMUNICATION SYSTEMS" filed concomitantly herewith and, the disclosure of which is hereby incorporated by reference. This code is derived from a (15,11) Hamming code. As an intermediate step, the (15,11) Hamming code may be shortened to an (11,7) code as specified in the IS-136. The (11,7) code is used for encoding the CPE on the IS-136 DCCH; it has a minimum Hamming distance of 3 and guarantees single error correction. However, false error correction, or interpretation of one codeword as another, may occur if 2 or more errors occur in the channel. Two error detecting capability may be provided by increasing the minimum Hamming distance of the code to 4 through the addition of a single parity bit. The resulting (12,7) code may be viewed as an extended (11,7) code.

The following coding procedure defines the relationship between the 7 bit AMI and 12 bit coded AMI (CAMI).
1. Let the AMI (7-bits)=$(d_6, d_5, d_4, d_3, d_2, d_1, d_0)$.
2. Form AMI information word polynomial a(X): $d_6X^6+d_5X^5+d_4X^4+d_3X^3+d_2X^2+d_1X^1+d_0X^0$
3. Multiply a(X) by $X^5$.
4. Obtain the remainder b(X) from dividing $X^5a(X)$ by $X^5+X^4+X^2+1$.
5. CAMI (12 bits) is defined as $(d_6, d_5, d_4, d_3, d_2, d_1, d_0, b_4, b_3, b_2, b_1, b_0)$.

Table 7 sets forth weight distribution of (11,7) and (12,7) codes; minimum Hamming distance of (11,7) code is 3 while minimum Hamming distance of (12,7) code is 4.

TABLE 7

| Hamming weight | Number of codewords | |
| --- | --- | --- |
| (Distance from all zero codeword) | (11,7) code | Extended (12,7) code |
| 1 | 0 | 0 |
| 2 | 0 | 0 |
| 3 | 13 | 0 |
| 4 | 25 | 38 |
| 5 | 25 | 0 |
| 6 | 27 | 52 |
| 7 | 23 | 0 |
| 8 | 10 | 33 |
| 9 | 3 | 0 |
| 10 | 1 | 4 |

Table 8 shows decimal values of the data sequences which result in the 38 codewords with weight 4 for the (12,7) extended code.

TABLE 8

| | | | | | | | | | |
| --- | --- | --- | --- | --- | --- | --- | --- | --- | --- |
| 1 | 3 | 4 | 6 | 7 | 8 | 9 | 10 | 13 | 14 |
| 16 | 17 | 18 | 20 | 26 | 28 | 32 | 33 | 34 | 36 |
| 40 | 41 | 50 | 53 | 56 | 64 | 66 | 67 | 68 | 69 |
| 72 | 81 | 82 | 88 | 96 | 100 | 106 | 112 | | |

The (12,7) code has a number of interesting properties. With this code, single error patterns can be corrected for all codewords, and in addition all patterns with two bit errors can be detected with certainty. Moreover, because of the parity check, the (12,7) code allows detection of all bursts with odd numbers of bit errors, if the code is used for detection.

In Table 7, there are 38 codewords at Hamming distance 4 from the all zero codeword. If the information sequences corresponding to these codewords are disallowed (Table 4), then all patterns of 3 bit errors can be corrected for the all zero codeword while still being able to correct any single error pattern for all other codewords. The all zero AMI is referred to as the default AMI and is reserved for the following: SLA=IDLE indicating contention slot, and SLF=E-NAK indicating explicit negative acknowledgment. It may also used to identify broadcast (point to multipoint) information on the downlink.

The mobile station 104 uses the following decoding rule:
Declare an AMI match if the Hamming distance between the mobile station's coded AMI (CAMI) and the received 12 bit word is strictly less than 2.
For the all zero codeword, declare a match if the Hamming weight of the received 12 bit word is strictly less than 4.

In accordance with another aspect of the present invention, a mobile station may execute the following procedures. A mobile station which transmits in a particular contention slot reads the corresponding SLF field to determine if its transmission was successful.

On receiving an ACK (i.e., SLF/coded AMI match), it reads the SLA field 954 on all sub-channels it is capable of operating on to determine if it is granted a reservation ("sniffing").

On declaring a NAK (i.e., SLF/coded AMI mismatch), it follows random access procedures for attempting another contention access.

A mobile station which transmits in a particular reserved slot reads the corresponding SLF field to determine if its transmission was successful.

On receiving an ACK (i.e., R/N=R), the mobile station reads the C/S field 958 to determine if it can transmit in the subsequent slot on the same sub-channel. If C/S= CONTINUE, the mobile station ignores the SLA field 954 and assumes that it has permission to transmit in the subsequent time slot associated with the same sub-channel. If C/S=STOP, the mobile station being acknowledged must continue sniffing for reservations. On receiving a NAK (i.e., R/N=N), the mobile station reads the SLA field 954 to determine if it has been assigned the subsequent slot. Those skilled in the art will appreciate that when the base station transmits R/N=N, it sets C/S=S.

The use of the PCF field 708 in accordance with the present invention should have fewer error conditions, unambiguous state transitions and better performance under error conditions than the IS-136 DCCH. The PCF field 708 provides considerable flexibility in assigning bandwidth to multiple users and allows the efficient management of contention, reservation and scheduling on each sub-channel without wasted slots.

The present invention may acknowledge a previous reserved or contention based access from one user, and assign the next slot to the same or any other user. This is done through the use of two local user identifier (AMI) values in the overhead fields: one used for feedback and one for assignment. Both slot by slot reservation and sub-channel ownership are allowed with a provision for reliably granting continuing reservations to a single user. The use of the feedback field (SLF) is context dependent.

The AMI is used as an implicit ACK in the feedback field in response to a contention access. For reserved access, the feedback field provides an ACK/NAK (R/N) field, a CONTINUE/STOP field and a CQF field to permit adaptive modulation. By selecting the all-zero AMI as an E-NAK or IDLE, and eliminating the 38 minimum weight codewords from the (12,7) code, the performance of the E-NAK and IDLE may be significantly improved.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. In a communication system, a method for media access control feedback over a packet channel divided in channel time slots comprising the steps of:
    dividing the channel time slots into sub-channel time slots;
    defining a packet channel feedback field associated with each sub-channel time slot;
    forming a sub-channel feedback field in the packet channel feedback field to indicate acknowledgments;
    forming a sub-channel assignment field in the packet channel feedback field to indicate time slot assignments;
    assigning a first temporary mobile identity to a first active mobile station and a second temporary local mobile identity to a second active mobile station;
    inserting the first temporary mobile identity into the sub-channel feedback field to indicate an acknowledgment for the first active mobile station;
    inserting the second temporary mobile identity into the sub-channel assignment field to indicate a time slot assignment for the second active mobile station; and
    sending the packet channel feedback field in a signaling message to the first and second active mobile stations.

2. The method as recited in claim 1 wherein the first temporary mobile identity is used to identify the first active mobile station to receive packet data signals.

3. The method as recited in claim 1 comprising the step of:
    invalidating the first temporary mobile identity after one transaction of packet data signals.

4. The method as recited in claim 1 wherein the step of assigning the first temporary mobile identity comprises the step of:
    assigning the first temporary mobile identity during a transaction initiation procedure in the system.

5. The method as recited in claim 1 wherein the step of assigning comprises the step of:
    assigning a plurality of temporary mobile identities and ones of the temporary mobile identities are reserved for special functions.

6. The method as recited in claim 1 wherein the step of assigning comprises the steps of:
    assigning a plurality of temporary mobile identities; and
    assigning a subset of the temporary mobile identities as mobile station identifiers.

7. The method as recited in claim 1 wherein the first temporary mobile identity is used to indicate a time slot assignment for the first active mobile station.

8. The method as recited in claim 7 comprising the step of:
    transmitting packet data signals on an uplink over the packet channel based on the time slot assignments.

9. In a communication system, a method for media access control feedback over a packet channel divided in channel time slots comprising the steps of:
    dividing the channel time slots into sub-channel time slots;
    defining a packet channel feedback field associated with each sub-channel time slot;
    assigning an first temporary mobile identity to first active mobile station and a second temporary mobile identity to a second active mobile station;
    transmitting packet data signals on an uplink over the packet channel based on the time slot assignments, wherein the step of transmitting comprises the steps of:
    forming a sub-channel feedback field in the packet channel feedback field to indicate acknowledgments; and forming a sub-channel assignment field in the packet channel feedback field to indicate time slot assignments, the sub-channel assignment field being substantially independent of the sub-channel feedback field;

inserting the first temporary mobile identity into the sub-channel feedback field to indicate an acknowledgment for the first active mobile station;

inserting the second temporary mobile identity into the sub-channel assignment field to indicate a time slot assignment for the second active mobile station; and sending the packet channel feedback field in a signaling message to the first and second active mobile stations.

10. The method as recited in claim 9 wherein a format of the sub-channel feedback field depends on whether it is in response to a contention access or a reserved access.

11. The method as recited in claim 9 wherein the sub-channel feedback field comprises the first temporary mobile identity that indicates acknowledgment in response to a contention access.

12. The method as recited in claim 9 wherein the step of assigning comprises the steps of:
assigning a plurality of temporary mobile identities; and
reserving a set of the temporary mobile identities for special functions.

13. The method as recited in claim 9 wherein the step of assigning comprises the steps of:
assigning a plurality of temporary mobile identities; and
using a subset of values for the temporary mobile identities as mobile station identifiers.

14. The method as recited in claim 9 wherein the sub-channel feedback field contains flags indicating acknowledgment and continued reservation on the sub-channel.

15. The method as recited in claim 9 wherein the step of forming a sub-channel feedback field comprises the step of:
setting the sub-channel feedback field to a special value to indicate a negative acknowledgment.

16. The method as recited in claim 15 wherein the step of forming a sub-channel assignment field comprises the step of:
setting the sub-channel assignment field to a special value to indicate contention.

17. The method as recited in claim 9 wherein the step of forming a sub-channel assignment field comprises the step of:
setting the sub-channel assignment field to value of the second temporary mobile identity to indicate time slot assignment.

18. The method as recited in claim 1 wherein the system comprises the first active mobile station and a base station, and wherein the method comprises the steps of:
transmitting from the first active mobile station a request to initiate packet data transmissions to the base station based on the packet channel feedback field;
including a suggested value for the first temporary mobile identity in the request; and
awaiting an acknowledgment from the base station in the packet channel feedback field.

19. The method as recited in claim 18 wherein an acknowledgment in the packet channel feedback field indicates acceptance of the suggested value for the first temporary mobile identity.

20. The method as recited in claim 18 comprising the step of:
if a negative acknowledgment is received in the packet channel feedback field, waiting a time period before the first active mobile station makes another request.

21. The method as recited in claim 18 wherein the step of waiting a time period comprises the step of:
waiting for an assignment of the first temporary mobile identity to the first active mobile station to be received from the base station.

22. A method for transmitting packet data signals in a time slotted packet channel comprising the steps of:
creating sub-channel time slots associated with the time slotted packet channel;
transmitting from a first active mobile station a request to initiate packet data transmissions to a base station;
including a suggested value for a first temporary mobile identity in the request;
awaiting an acknowledgment from the base station;
if a negative acknowledgment is received, waiting for an assigned value for the first temporary mobile identity of the first active mobile station to be received from the base station in a packet channel feedback field of a signaling message; and
wherein the packet channel feedback field comprises the first temporary local mobile identity to indicate acknowledgment for the first active mobile station, wherein the packet channel feedback field also comprises a second temporary local mobile identity assigned to a second active mobile station to allocate one or more of the sub-channel time slots for the second active mobile station.

23. The method as recited in claim 22 further comprising the step of:
identifying assignments of sub-channel time slots based on the first temporary mobile identity.

24. The method as recited in claim 23 further comprising the step of:
invalidating the first temporary mobile identity after one transaction of packet data signals.

25. A communication device for communicating via packet data signals over a packet channel comprising:
a sub-channel controller for identifying acknowledgments and assignments of time slots on the packet channel based on a packet channel feedback field; and
a channel access manager for controlling access to the packet channel based on the acknowledgments and assignments;
wherein the packet channel feedback field comprises a sub-channel feedback field to indicate acknowledgments;
wherein the packet channel feedback field comprises a sub-channel assignment field to indicate time slot assuagements;
wherein a first one of the sub-channel feedback field and the sub-channel assignment field in a signaling message comprises a first temporary mobile identity assigned to the communication device, wherein a second one of the sub-channel feedback field and the sub-channel assignment field in the signaling message comprises a second temporary mobile identity assigned to another communication device.

26. The communication device as recited in claim 25 wherein the sub-channel controller identifies acknowledgments based on the packet channel feedback field and the first temporary mobile identity associated with the communication device.

27. The communication device as recited in claim 26 wherein the device is a mobile station.

28. The method as recited in claim 1 wherein the sub-channel assignment field being substantially independent of the sub-channel feedback field.

29. The communication device as recited in claim 25 wherein the sub-channel assignment field being substantially independent of the sub-channel feedback field.

30. The method as recited in claim 1 comprising the steps of:
   employing the sub-channel feedback field to acknowledge a previous reserved or contention based access from the first active mobile station; and
   employing the sub-channel assignment field to assign a next one of the sub-channel time slots to the second active mobile station.

31. In a communication system, a method for media access control feedback over a packet channel divided in channel time slots comprising the steps of:
   dividing the channel time slots into sub-channel time slots;
   defining a packet channel feedback field associated with each sub-channel time slot;
   assigning a first temporary local mobile identity to a first active mobile station and a second temporary local mobile identity to a second active mobile station;
   inserting the first temporary local mobile identity into the packet channel feedback field of a signaling message to indicate an acknowledgment for the first active mobile station;
   inserting the second temporary local mobile identity into the packet channel feedback field of the signaling message to allocate one or more of the sub-channel time slots for the second active mobile station; and
   sending the signaling message to the first and second active mobile stations.

32. The method as recited in claim 31 comprising the step of:
   freeing the first temporary local mobile identity, upon completion of a transaction by the first active mobile station, for subsequent assignment of the first temporary local mobile identity to a third active mobile station.

33. The method as recited in claim 31 comprising the step of:
   coordinating contemporaneous use of one of the sub-channel time slots by the first active mobile station and the second active mobile station.

34. The method as recited in claim 33 wherein the step of coordinating comprises the step of:
   allowing the second active mobile station to use the one of the sub-channel time slots for a transaction while the first active mobile station waits to finish a transaction.

35. The method as recited in claim 31 comprising the steps of:
   assigning the first temporary local mobile identity to the first active mobile station to allow the first active mobile station access to one or more of the sub-channel time slots for a first transaction; and
   assigning the second temporary local mobile identity to the second active mobile station to allow the second active mobile station access to one or more of the sub-channel time slots for a second transaction that occurs contemporaneously with the first transaction.

36. The method as recited in claim 31 comprising the step of:
   dynamically changing an assignment of the first active mobile station from a first one of the sub-channel time slots to a second one of the sub-channel time slots to complete a transaction.

37. The method as recited in claim 31 comprising the step of:
   employing the first and second temporary local mobile identities to identify uplink time slot assignments and to identify a recipient of data on a downlink.

38. The method as recited in claim 31 comprising the steps of:
   initially assigning one of the sub-channel time slots to the first active mobile station to begin a transaction; and
   subsequently assigning an additional one of the sub-channel time slots to the first active mobile station to continue with the transaction.

39. The method as recited in claim 38 wherein the step of subsequently assigning comprises the steps of:
   determining that the first active mobile station would benefit from use of the additional one of the sub-channel time slots during the transaction; and
   inserting, without a contention offer of the additional one of the sub-channel time slots, the first temporary local mobile identity into a sub-channel assignment field in the packet channel feedback field to indicate assignment of the additional one of the sub-channel time slots to the first active mobile station.

40. The method as recited in claim 31 wherein a base station selects the first and second temporary local mobile identities for the first and second active mobile stations from a pool of available temporary local mobile identities.

* * * * *